Oct. 29, 1957 R. H. DAVIES ET AL 2,811,168
LIQUID LEVEL CONTROL VALVES
Filed May 27, 1952 3 Sheets-Sheet 1

INVENTORS
ROBERT H. DAVIES and
BY FREDERICK E. AMON JR.

John N. Wolfram
ATTORNEY

INVENTORS
ROBERT H. DAVIES and
BY FREDERICK E. AMON JR.

John N. Wolfram
ATTORNEY

Oct. 29, 1957   R. H. DAVIES ET AL   2,811,168
LIQUID LEVEL CONTROL VALVES
Filed May 27, 1952   3 Sheets-Sheet 3

INVENTORS
ROBERT H. DAVIES and
BY FREDERICK E. AMON JR.

John N. Wolfram
ATTORNEY

United States Patent Office 2,811,168
Patented Oct. 29, 1957

2,811,168

LIQUID LEVEL CONTROL VALVES

Robert H. Davies, Aurora, and Frederick E. Amon, Jr., Shaker Heights, Ohio, assignors to The Parker Appliance Company, Cleveland, Ohio, a corporation of Ohio Application May 27, 1952, Serial No. 290,226

16 Claims. (Cl. 137—414)

This invention relates to valves for automatically controlling the level to which a tank may be filled with liquid. The invention is more particularly directed to a valve for this purpose which utilizes a main fluid pressure operated valve which may be actuated by the pressure of fluid on either of two separate diaphragms and with a separate float operated pilot valve for controlling the pressure of the fluid acting on each of the diaphragms.

The present invention is particularly adapted for installations in aircraft fuel tanks or other places where it is desirable to introduce a liquid into the tank at a relatively high rate of flow and where it is highly essential that the level control valve function properly at the instant that a predetermined level of liquid in the tank is reached whereby overfilling and bursting of the tank may be avoided. The present invention safe-guards proper operation of the control valve by providing two separate diaphragms, each controlled by its own float operated pilot valve, and each capable of closing off the main valve in the event that the other diaphragm or its respective pilot valve should break or otherwise fail to properly function.

An object of the present invention is to provide a liquid level control valve of the type described in which a fluid pressure operated main valve may be actuated by fluid pressure acting upon either of two separate diaphragms.

Another object is to provide a liquid level control valve having a single main valve which may be actuated to a closed position by either of two fluid pressure actuated diaphragms and in which either diaphragm will cause the valve to be actuated if the other diaphragm should break or otherwise fail to function.

It is another object to provide a liquid level control valve comprising a single main valve which may be actuated by the pressure of fluid acting upon either of two separate diaphragms and in which the fluid pressure on each diaphragm is controlled by a separate pilot valve so that if either pilot valve should fail to operate the other will control the fluid pressure on the respective diaphragm and control the actuation of the main valve to closed position when the predetermined level of liquid in the tank has been reached.

It is another object of the invention to provide a liquid level control valve of the type described in which there are two separate fluid pressure actuated diaphragm assemblies for actuating a single main valve and in which the diaphragm assemblies are movable independently of each other.

It is another object of the invention to provide a liquid level control valve comprising a main valve attached to a diaphragm which may be actuated by fluid pressure for closing the main valve, and in which a second diaphragm is spaced from the first and which may be moved by fluid pressure into engagement with the first diaphragm for moving the latter and the valve carried thereby into valve closing position.

These and other objects of the invention are readily apparent from the following description and from the drawings in which, Figure 1 is a view showing a cross-section of the main valve attached to the bottom wall of a tank and showing an elevation of the float operated pilot valves mounted at the top of the tank. The main valve is in its normally closed position.

Figure 1:
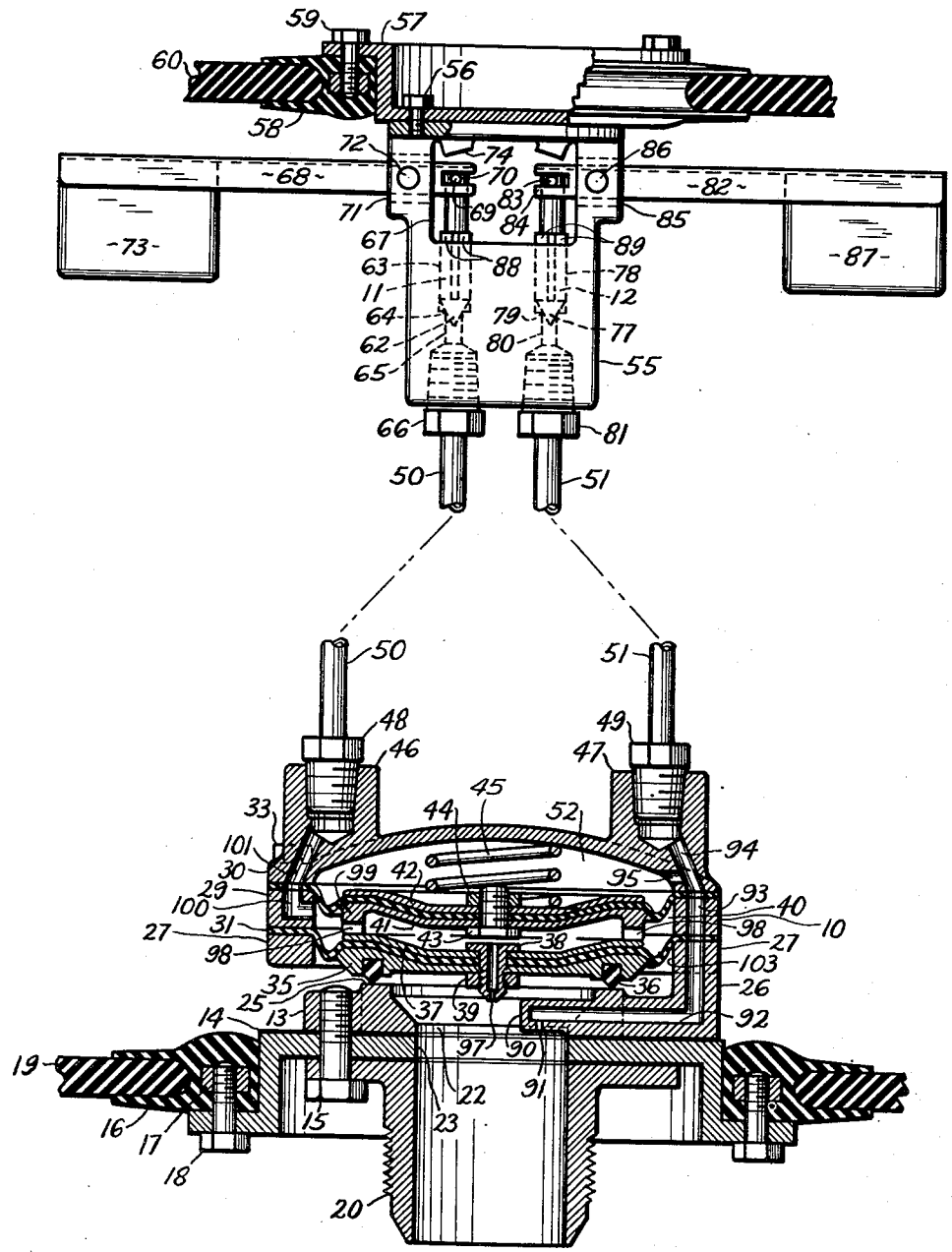

The invention resides in the particular construction of the main valve and also in the combination of the main valve with a pair of pilot valves. As shown in Figure 1, the main valve, generally designated as 10, may be mounted at the bottom of a conventional rubber type fuel tank for aircraft. The pilot valves 11 and 12 are mounted at the top of the tank.

The main valve 10 includes a body 13 which is attached to a tank mounting plate 14 by means of bolts 15. The plate 14 is attached to a rubber adaptor 16 having metal inserts 17 for receiving the mounting screws 18. The adaptor 16 is vulcanized to the bottom wall 19 of the rubber fuel tank.

Attached to the underside of the mounting plate 14 by the bolts 15 is a fitting 20 to which a fluid supply line, not shown, may be attached. The main valve seat member 13 has a central opening 22 in register with openings 23 and 24 of the mounting plate 14 and inlet fitting 20, respectively. Surrounding the opening 22 is a flat valve seat 25. Several ribs 26 spaced about the outer margin of the heat member 13 connect the latter to a clamping ring 27.

Mounted above the clamping ring 27 is a spacer ring 29 and a cap 30. Clamped between the ring 27 and the spacer 29 is a primary diaphragm 31, and clamped between the spacer 29 and the cap 30 is a secondary diaphragm 32. Bolts 33 spaced around the outer margin of the main valve maintain the ring 27, spacer 10, and cap 30 in assembled relation.

Mounted on the underside of the primary diaphragm 31 is a main valve disk 35 which carries a rubber sealing member 36. The valve disk 35 is attached to the primary diaphragm 31 by means of a supporting plate 37 and a bolt 38 and nut 39.

The secondary diaphragm 32 is spaced from the primary diaphragm 31 to form a primary pressure chamber 40 therebetween. An abutment disk 41 is attached to the secondary diaphragm 32 by means of a supporting plate 42, a bolt 43 and a nut 44. A spring 45 is interposed between the supporting plate 42 and the upper wall of the cap 30.

The cap 30 has a pair of port members 46 and 47 in which are mounted two fittings 48 and 49 from which tubes 50 and 51 lead to the pilot valves 11 and 12 respectively.

The space between the secondary diaphragm 32 and the top wall of the cap 30 provides a secondary pressure chamber 52.

The pilot valves 11 and 12 are mounted in a common housing 55 which, by means of bolts 56 is attached to a mounting plate 57, which in turn is attached to a rubber adapter 58 by means of bolts 59. The rubber adaptor 58 is vulcanized to the top wall 60 of the rubber tank.

The pilot valve 11 includes a valve member 62 mounted in a bore 63 and is adapted to seat on a valve seat 64 surrounding an inlet opening 65 which communicates with the tube fitting 66 and the tube 50.

The bore 63 is open to a cut-out portion 67 in the housing 55 which in turn is open to the interior of the tank.

The pilot valve 62 is connected at its upper end to a float arm 68 by means of a pin 69 riding in a slot 70 of the float arm. The latter passes through an opening 71 in the housing 55 and is pivotally mounted on the housing by a pin 72. At the outer end of the float arm there is mounted a float 73 of cork or other light weight material.

A stop member 74 is adapted to be engaged by the inner end of the float arm 68 to limit the extent to which the float 73 may drop when the tank is not full of liquid.

The pilot valve 12 together with its float and supporting structure is constructed similarly to pilot valve 11. It includes the valve member 77 operating in a bore 78 and engageable with a seat 79 for opening or closing the inlet port 80 which is connected to the tube 51 by means of the fitting 81. The upper end of the pilot valve 77 is connected to the float arm 82 by means of pin 83 and slot 84. The float arm 82 passes through the housing opening 85 and is pivotally mounted to the housing by means of a pin 86. At the outer end of the float arm there is mounted a float 87.

The pilot valve 62 has non-circular portions 88 and the pilot valve 77 has non-circular portions 89 to permit the passage of fluid from the respective inlets 65 and 80 to the opening 67 when the pilot valves are open.

The body 13 has a projection 90 extending part way across the inlet opening 22. This projection has an orifice 91 leading to a passage 92. The latter communicates with a passage 93 in the spacer ring 29 and a drilled opening 94 in the cap port member 47. A transverse opening 95 connects the drilled opening 94 to the secondary pressure chamber 52.

The bolt 38 is hollow and has an orifice 97 for admitting fluid from the inlet opening 22 to the primary pressure chamber 40. Slots 98 in the abutment member 41 permit the free circulation of fluid within the primary pressure chamber 40 on both sides of the outer rim 99 of the abutment member 41.

A passage 100 in the spacer member 29 connects the primary pressure chamber 40 to a drilled opening 101 in the port member 46.

Figure 2:
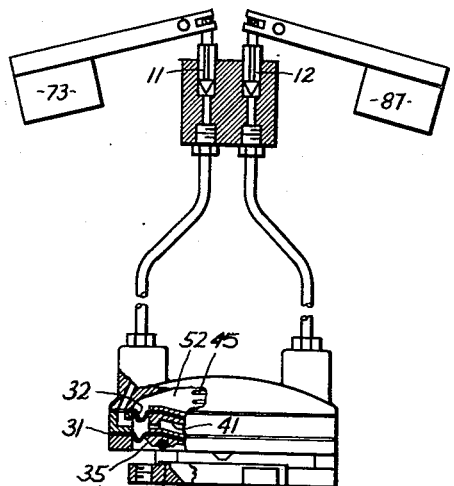
Figure 2 is a view of the main valve partly in section and a schematic view of the float operated pilot valves showing the parts in their normal position for filling, that is, with the main valve open and the pilot valves open.

In the normal operation of the valve, the main valve is closed as shown in Figure 1 and the pilot valves are open as shown in Figure 2 when the tank is not full and the fluid source has not been attached or turned on. In this position, the main valve disk 35 is held in closed position by the spring 45 acting through the abutment member 41. The floats 73 and 87 are held downward by gravity to hold the respective pilot valves 11 and 12 in open position.

When fluid from a supply source, not shown, is introduced through the fitting 20, the pressure of the incoming fluid will lift the valve disk 35 from the seat 25 against the action of the spring 45, as shown in Figure 2, and the fluid will pass into the interior of the tank through the openings between the ribs 26 which separate the seat member 13 from the clamping ring 27. Meanwhile, the fluid from the inlet 22 will pass through the orifice 97 into the primary pressure chamber 40 and then will pass through the openings 100 and 101, the fitting 48, tube 50, fitting 66, inlet opening 65, and pass the pilot valve member 62 (which is in open position) to the pilot valve housing opening 67 and to the interior of the tank. All of the passages just mentioned which lead from the primary pressure chamber 40 to the interior of the tank are of larger flow capacity than the orifice opening 97 so that fluid can leave the pressure chamber 40 faster than it can enter, and hence the fluid pressure within the primary pressure chamber 40 will be lower than the pressure of the fluid in the inlet opening 22.

At the same time, fluid from the inlet opening 22 will pass through the orifice 91 into the passages 92, 93, and 94. From the latter, some of the fluid will pass through the opening 95 into the secondary pressure chamber 52 and the remainder will continue to pass through the fitting 49, the tube 51, fitting 81, pilot valve inlet opening 80, bore 78, opening 67, and then to the interior of the tank. Again, the passages leading from the secondary pressure chamber 52 are of larger flow capacity than the inlet orifice 91 so that the pressure of the fluid in pressure chamber 52 will remain lower than the pressure of the fluid in the inlet opening 22 as long as pilot valve 12 remains open.

Floats 73 and 87 of pilot valves 11 and 12 are preferably mounted at the same level so that as the fluid in the tank rises to a predetermined level the floats will rise together and the pilot valves will close simultaneously. However, if desired, either float could be mounted at a slightly higher level than the other so that the pilot valve associated therewith would shut off at a higher level of liquid in the tank than the other. In this instance, a pilot valve whose float is mounted at the higher level would not normally shut off unless either the other pilot valve or the main valve had not properly functioned.

With the floats mounted at the same level, when the fluid in the tank has risen to the predetermined level, both floats will rise and shut the respective pilot valves. Closure of the pilot valve 11 shuts off the flow of fluid from the primary pressure chamber 40 and permits the fluid within such chamber to reach a pressure substantially equal to that within the inlet port 22. At the same time, closing of the pilot valve 12 shuts off the passage of fluid through the tube 51 and causes the pressure of the fluid within the secondary pressure chamber 52 to likewise become substantially the same as that in the inlet port 22.

The fluid within the primary pressure chamber 40 acts downward upon the diaphragm 31 and its supporting plate 37 across a circular area whose diameter is substantially equal to the diameter of the valve disk 35 plus one-half the difference in diameters between the valve disk 35 and the inner face 103 of the clamping ring 27. This overbalances the pressure of the fluid on the underside of the valve disk 35 tending to keep the main valve open and thus causes the valve disk 35 to move to a closed position against the seat 25 as shown in Figure 1. Meanwhile, pressure of the fluid within the primary pressure chamber 40 also acts upwardly against the secondary diaphragm 32 and the abutment member 41 but the resulting force is counterbalanced by the pressure of the fluid in the secondary chamber 52 acting downwardly upon the diaphragm 32 and the supporting plate 42. Hence the diaphragm 32 will be held downward with the abutment member 41 in contact with the plate 37 by the action of the spring 45.

Figure 3:
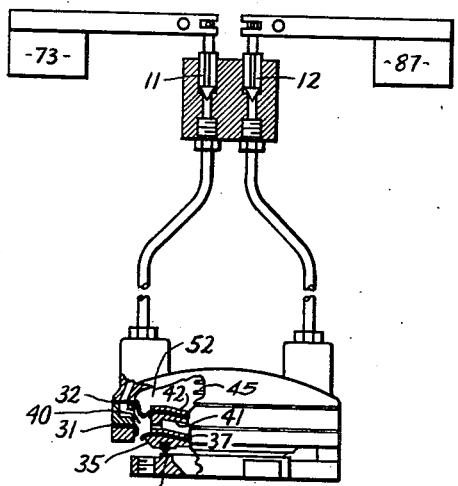
Figure 3 is a view similar to Figure 2 but showing the lower diaphragm ruptured, the main valve closed by the functioning of the upper or secondary diaphragm, and with both pilot valves closed.

If before or during the filling operation the lower diaphragm should become ruptured, the main valve will close and the parts will assume the positions as shown in Figure 3 when the tank has been filled to a predetermined level. In this instance, when the float 73 rises to shut off the pilot valve 11 there will be no build-up of pressure within the primary chamber 40 since the fluid may pass readily through the ruptured portion of the diaphragm 31 into the interior of the tank. However, closure of the pilot valve 12 will again cause the pressure to build up in the secondary pressure chamber 52 and act downwardly upon the secondary diaphragm 32 and its supporting plate 42. Since there is no counterbalancing upward pressure on the secondary diaphragm 32 from the primary pressure chamber 40, the secondary diaphragm 32 and the abutment plate 41 will be forced downwardly against the plate 37 and cause the valve disk to move downwardly to close against the valve seat 25.

Figure 4:
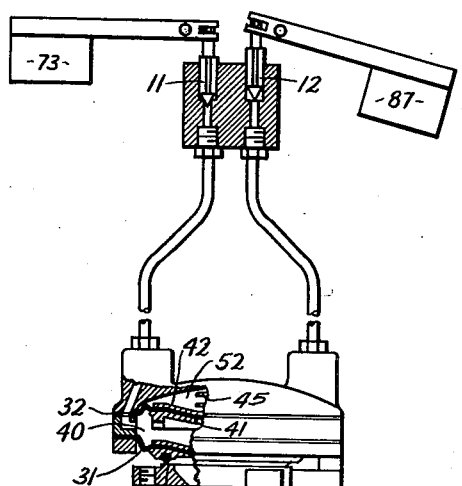
Figure 4 is a view similar to Figure 2 but showing the main valve closed by actuation of the lower or primary diaphragm and with the pilot valve for the upper or secondary diaphragm open due to logging of the float or other malfunctioning.

In the event the float 87 should become logged either before or during filling, or if the pilot valve 12 should become stuck in the open position, the main valve will nevertheless close when the tank has been filled to the predetermined level. This condition is illustrated in Figure 4. In this event, the float 73 rises in the usual manner when the predetermined level has been reached, closing off the pilot valve 11 and causing the pressure of the fluid to build up within the primary pressure chamber 40. The pressure of this fluid acting downwardly upon the primary diaphragm 31 causes the valve disk 35 to close off against the valve seat 25 in the normal manner. Meanwhile, since the pilot valve 12 has remained open, there will be no building up of fluid pressure within the secondary pressure chamber 52 and hence the relatively higher pressure within the chamber 40 will cause the secondary diaphragm 32 and its supporting members 41 and 42 to move away from the lower diaphragm 31 and its plate 37 and assume the position shown in Figure 4.

If instead of the pilot valve 12 sticking in the open position, or the float 87 becoming logged, the pilot valve 11 or the float 73 should become affected in such manner, the main valve will still close when the tank has been filled to a predetermined level. This condition is not illustrated in the drawings, but upon closing, the main valve parts would assume the positions shown in Figure 2 and with the pilot valve 11 open and pilot valve 12 closed. In this instance, closure of the pilot valve 12 would cause the pressure of the fluid to build up in the secondary chamber 52 while there would be no build-up of pressure in the primary chamber 40 because of the pilot valve 11 remaining open. As a result, the upper diaphragm 32 and its supporting members would be forced downwardly against the plate 37 and cause the valve disk 35 to close against the inlet seat 25.

Figure 5:
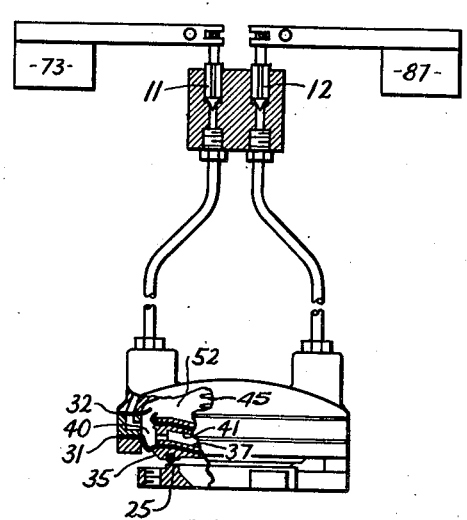
Figure 5 is a view similar to Figure 2 but showing both pilot valves closed, the secondary diaphragm ruptured, and the main valve closed by the functioning of the lower or primary diaphragm.

Another contingency which does not affect closure of the main valve is rupture of the secondary diaphragm 32. This condition is illustrated in Figure 5. When the predetermined level in the tank has been reached, the floats 73 and 87 will rise and close the respective pilot valves 11 and 12. Rupture of the diaphragm 32 permits the fluid to freely circulate between the primary and secondary pressure chambers 40 and 52, but since the ports leading away from both of these chambers have been closed by the pilot valves, the fluid pressure in both chambers will build up simultaneously with the result that the valve disk 35 will be moved to closed position by the pressure of the fluid acting on the upper side of the primary diaphragm 31 and its supporting plate 37. Since the areas of the upper and lower sides of the ruptured diaphragm 32 and its supporting members are equal, the resulting pressures upon the opposite side of these members will be balanced. However, these members will be forced downwardly by the spring 45 and the force of the spring will be transmitted to the plate 37 by the abutment member 41.

Figure 6:
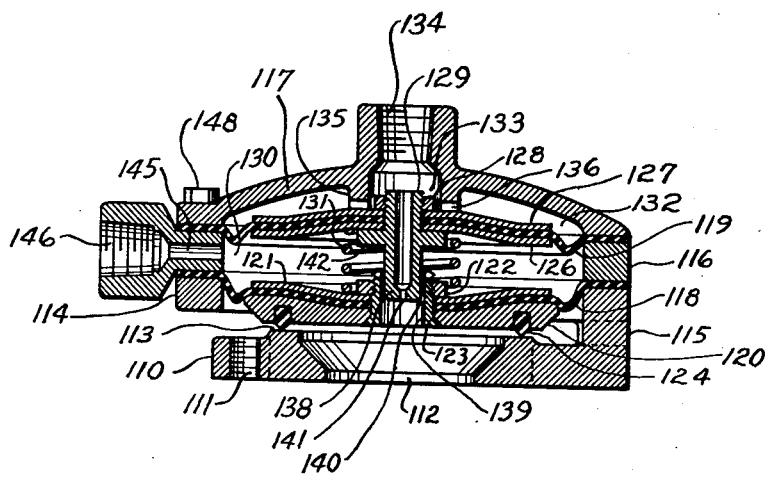
Figure 6 is a cross-section view of an alternate form of the main valve.

The alternate form of main valve shown in Figure 6 performs the same functions as the main valve 10 of Figure 1 but has a few changes in the detail construction. Thus the alternate form has a main valve seat member 110 which may be attached to the tank mounting plate 14 of Figure 1 through the utilization of threaded openings 111. The seat member 110 has a central opening 112 surrounded by a flat valve seat 113 and it is attached to a clamping ring 114 by means of several ribs 115.

Mounted above the clamping ring 114 is a spacer ring and a cap 117. Clamped between the ring 114 and the spacer 116 is a primary diaphragm 118 and clamped between the spacer 116 and the cap 117 is a secondary diaphragm 119. Bolts 148 hold the parts together.

The primary diaphragm 118 is a part of a primary diaphragm assembly which includes a valve disk 120 and a plate 121 between which the central portion of the diaphragm is clamped by means of a nut 122 and a hollow bolt 123. The valve disk 120 carries a rubber sealing member 124.

The secondary diaphragm assembly includes plates 126 and 127 between which the central portion of the diaphragm 119 is clamped by means of a nut 128 and the stud 129. The two diaphragm assemblies are movable with respect to each other and form an expansible pressure chamber 130 therebetween. A spring 131 within the primary pressure chamber 130 normally urges the diaphragm assemblies away from each other. If desired, this spring may be between the secondary diaphragm and the cap 117.

The cap 117 overlies the secondary diaphragm assembly to form a secondary pressure chamber 132 therebetween. A port 133 leads from the secondary pressure chamber and has a threaded portion 134 to which a pilot line leading to a secondary pilot valve, not shown in Figure 6, may be attached. An annular depending portion 135 serves as a stop for the secondary diaphragm assembly and has slots 136 for maintaining communication between the port 133 and the secondary pressure chamber 132 when the secondary diaphragm assembly is in its uppermost position.

The hollow stud 129 has a depending portion 138 which telescopes with the bore 139 of the bolt 123. The length of the depending portion 138 is such that the telescoping relation is maintained in all of the possible relative positions between the primary and secondary diaphragm assemblies. Also, the depending portion 138 has a loose fit within the bore 139 and the clearance 140 therebetween constitutes an annular restricted passage which connects the inlet 112 to the primary pressure chamber 130.

A restricted opening 141 in the stud 129 connects the inlet 112 to the secondary pressure chamber 132 through the port 133 and the slots 136. A flange 142 on the stud is adapted to engage the upper end of the bolt 123 when the diaphragm assemblies move toward each other.

A duct 145 connects the primary pressure chamber 130 with a threaded port 146 to which a pilot line leading to a primary pilot valve, not shown, may be attached.

Operation of the alternate form of main valve shown in Figure 6 is similar to that of the form shown in Figure 1. Thus during filling fluid pressure within the inlet 112 moves the valve disk 120 to an open position and fluid passes between the valve seat 113 and the clamping ring 114 into the tank. When the pilot valves attached to the ports 134 and 146 close, fluid pressure builds up in both the primary pressure chamber 130 and the secondary pressure chamber 132. The secondary diaphragm assembly is balanced between the fluid pressures acting within the two pressure chambers but will be held in its uppermost position by the spring 131. Meanwhile, the fluid pressure within the primary chamber 130 acts downward upon the primary diaphragm assembly to cause the valve to close.

If the lower diaphragm 118 should become ruptured, closure of the pilot valve connected to the port 146 will not cause build up of fluid pressure within the primary pressure chamber 130 but closure of the pilot valve connected to the port 134 will cause a build-up of fluid pressure in the secondary chamber 132. This pressure moves the secondary diaphragm downward and engagement of the shoulder 142 with the end of the hollow bolt 123 will cause the primary diaphragm assembly to move downward with the secondary diaphragm assembly and thus effect closure of the valve.

Figure 7:
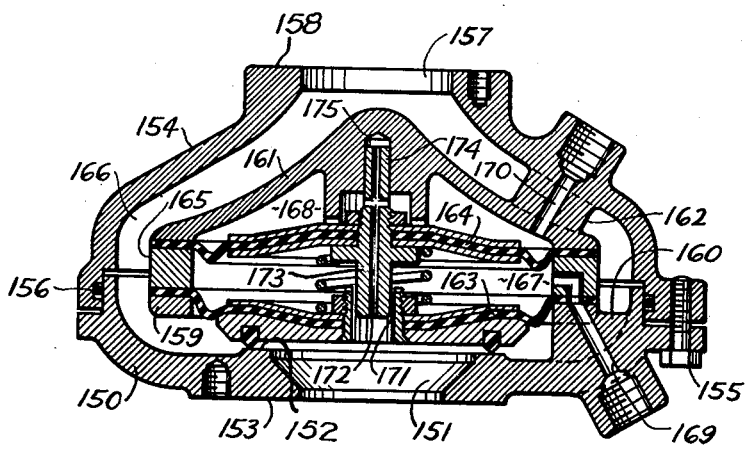
Figure 7 is a cross-section view of another alternate form of the main valve.

The other alternate form of main valve shown in Figure 7 is similar to the form shown in Figure 6 except that the inlet and outlet ports for the main flow are in axial alignment. This permits the valve to be mounted exteriorly of the tank whose filling level it will control and directly in the pipe line leading to the tank. The valve is thus more readily accessible for installation and servicing.

In this form of the valve a body is formed around the structure which supports the diaphragm assemblies so as to form a flow chamber around the latter structure to direct the main flow from the inlet to an outlet port which is in axial alignment with the inlet. In the form disclosed in Figure 7 the body is formed in two sections. The inlet section 150 contains the inlet port 151 and the valve seat 152. Surrounding the inlet port is a flat face 153 to which may be attached a supply line by means of a fitting similar to the fitting 20 shown in Figure 1. An outlet body section 154 is attached to the inlet section by means of bolts 155 and the two sections are sealed by a packing ring 156. The section 154 has an outlet port 157 surrounded by a flat face 158 which may be utilized to connect the valve either to an external face of a fuel tank or to another pipe leading to the fuel tank.

The inlet body section 150 is rigidly connected to a clamping ring 159 by means of several ribs 160 spaced outwardly from the valve seat 152. Likewise, the outlet section 154 is rigidly connected to a cap member 161 by means of several ribs 162.

Primary and secondary diaphragm assemblies 163 and 164 are clamped by the ring 159 and the cap 161 against a spacer ring 165. The inlet and outlet sections 150 and 154 are spaced from the ring 159, spacer 165 and cap 161 so as to form a flow chamber 166 therearound and leading from the inlet 151 to the outlet 157. The diaphragm assemblies and the cap 161 define primary and secondary pressure chambers 167 and 168 respectively. Ducts 169 and 170 provide means for connecting the respective pressure chambers to primary and secondary pilot valves in the same manner as described in connection with the ducts 94 and 101 of Figure 1. Likewise, restricted passages 171 and 172 connect the inlet port 151 with the primary and secondary pressure chambers. In addition, a bolt 173, which is a part of the secondary diaphragm assembly 164, has a cylindrical extension 174 fitted within a bore 175 of the cap 161 for guiding the movement of the secondary diaphragm assembly.

The operation of the line type of valve as shown in Figure 7 is exactly the same as the operation of the type shown in Figure 6, except that the main flow passes from the inlet port 151, through the flow chamber 166 to the outlet port 157. It is not believed necessary to redescribe the remainder of the operation.

Although the drawings illustrate float operated pilot valves for use in connection with each main fluid pressure operated valves, it is obvious that the pilot valves could be of other types, depending upon the particular installation for which said main valve is to be used.

In addition, many other changes in the detail structure and arrangement can be made without departing from the invention as set forth in the following claims:

We claim:

1. In a fluid pressure operated valve, a casing having inlet and outlet ports and an annular valve seat surrounding and facing away from the inlet port, first and second diaphragms within the casing and having movable portions, said portion of each diaphragm being movable in its entirety toward and away from said portion of the other diaphragm to form an expansible pressure chamber therebetween, a valve member attached to the first diaphragm and movable therewith to and from the valve seat for controlling the passage of fluid from the inlet to the outlet, said valve member when closed being subject to fluid pressure within the inlet port across an area bounded by said valve seat and tending to open the same, a duct leading from the pressure chamber and adapted to be opened or closed to control discharge of fluid therefrom, a restricted passage connecting the pressure chamber to the inlet port, said first diaphragm having an area subject to fluid pressure within the pressure chamber greater than the area of the valve member exposed to pressure of fluid in the inlet port when the valve member is closed and movable by the fluid pressure in the pressure chamber away from the second diaphragm for carrying the valve member to closed position, said second diaphragm having means adapted to move the first diaphragm into valve closing position in the event there is insufficient fluid pressure within the pressure chamber to move the first diaphragm.

2. In a fluid pressure operated valve, a casing having a single inlet and an outlet port, an annular valve seat surrounding and facing away from the inlet port, first and second diaphragms within the casing and clamped at their outer margins to the casing, the entire unclamped portions of each diaphragm being of substantially the same diameter and movable independently of the other diaphragm and forming an expansible pressure chamber therebetween, a valve member attached to the first diaphragm and movable therewith to and from the valve seat for controlling the passage of fluid from the inlet to the outlet port, a second pressure chamber between the second diaphragm and the casing, ducts leading from each pressure chamber and adapted to be opened or closed to control discharge of fluid from the respective chamber, restricted passages connecting each pressure chamber with the inlet port, said second diaphragm being movable by fluid pressure within the second chamber into engagement with the first diaphragm for moving the first diaphragm to a valve closing position.

3. In a fluid pressure operated valve, a casing having a single inlet port and an outlet port and an annular valve seat surrounding and facing away from the inlet port, first and second diaphragms within the casing and having movable portions, said portion of each diaphragm being movable in its entirety toward and away from said portion of the other diaphragm to form an expansible pressure chamber therebetween, a valve member attached to the first diaphragm and movable therewith to and from the valve seat for controlling the passage of fluid from the inlet to the outlet, said valve member when closed being subject to fluid pressure within the inlet port across an area bounded by said valve seat and tending to open the same, a duct leading from the pressure chamber and adapted to be opened or closed to control discharge of fluid therefrom, a restricted passage through the valve member and the first diaphragm connecting the pressure chamber to the inlet port, said first diaphragm having an area subject to fluid pressure within the pressure chamber greater than the area of the valve member exposed to pressure of fluid in the inlet port when the valve member is closed and movable by the fluid pressure in the pressure chamber away from the second diaphragm for carrying the valve member to closed position, said second diaphragm having means adapted to move the first diaphragm into valve closing position in the event there is insufficient fluid pressure within the pressure chamber to move the first diaphragm.

4. In a fluid pressure operated valve, a casing having a single inlet port and an outlet port, an annular valve seat surrounding and facing away from the inlet port, first and second diaphragms within the casing and clamped at their outer margins to the casing, the entire unclamped portion of each diaphragm being movable independently of the other diaphragm and forming an expansible pressure chamber therebetween, a valve member attached to the first diaphragm and movable therewith to and from the valve seat for controlling the passage of fluid from the inlet to the outlet port, a second pressure chamber between the second diaphragm and the casing, ducts leading from each pressure chamber and adapted to be opened or closed to control discharge of fluid from the respective chamber, restricted passages connecting each pressure chamber with the inlet port, said second diaphragm being movable by fluid pressure within the second chamber into engagement with the first diaphragm for moving the first diaphragm to a valve closing position and a spring in the second pressure chamber engaging the second diaphragm and constantly urging the same toward the first diaphragm.

5. In a fluid pressure operated valve, a casing having inlet and outlet ports, first and second diaphragms within the casing and clamped at their outer margins to the casing, the entire unclamped portion of each diaphragm being movable independently of the other diaphragm and forming an expansible pressure chamber therebetween, a valve member attached to the first diaphragm and movable therewith for controlling the passage of fluid from the inlet to the outlet port, a second pressure chamber between the second diaphragm and the casing, ducts leading from each pressure chamber and adapted to be opened or closed to control discharge of fluid from the respective chamber, restricted passages connecting each pressure chamber with the inlet port, said second diaphragm being movable by fluid pressure within the second chamber into engagement with the first diaphragm for moving the first diaphragm to a valve closing position and a spring in one of the pressure chambers normally urging the first diaphragm toward a valve closing position when there is no fluid pressure in the second chamber.

6. A fluid pressure operated valve in accordance with claim 2 wherein the first diaphragm has a hollow member attached thereto, the second diaphragm has a second member attached thereto and telescoped with the hollow member, a clearance between the telescoped portions to provide said restricted passage for the first pressure chamber, said restricted passage for the second pressure chamber being through the second member.

7. In combination, a fluid pressure operated main valve and a pilot valve for operating the main valve, comprising a casing having an inlet and an outlet, first and second movable diaphragm assemblies in the casing, each assembly including a flexible diaphragm and each assembly being movable in its entirety independently of the other diaphragm assembly and forming a first pressure chamber therebetween, a valve member attached to the first diaphragm assembly and movable therewith for opening and closing the inlet, a second pressure chamber within the casing, a duct leading from the second pressure chamber to the pilot valve, said pilot valve having no mechanical operating connection with the second diaphragm assembly and being adapted to open and close the duct to control discharge of fluid from the second pressure chamber, a restricted passage constantly connecting the inlet to the second pressure chamber, said pressure chambers being separated by said second diaphragm assembly whereby upon rupture of the second diaphragm the chambers will be joined, said first diaphragm assembly being movable by fluid pressure within the joined chambers for carrying the valve member to closed position.

8. A fluid pressure operated valve in accordance with claim 7 wherein the first diaphragm assembly has a hollow member attached to the central portion thereof, the second diaphragm assembly has a depending member attached to the central portion thereof and telescoped with the hollow member, a clearance between the telescoped portions to provide a restricted passage from the inlet to the first pressure chamber, said restricted passage for the second pressure chamber being through the depending member.

9. A fluid pressure operated valve in accordance with claim 2 wherein the first diaphragm has a hollow member attached thereto, the second diaphragm has a second member attached thereto and telescoped with the hollow member, an abutment shoulder on the second member, a clearance between the telescoped portions to provide a restricted passage for the first pressure chamber, said restricted passage for the second pressure chamber being through the second member, said engagement between the diaphragms being provided by contact of the abutment shoulder with the hollow member.

10. In combination, a liquid pressure operated main valve and a pair of pilot valves for controlling the main valve, the main valve comprising a casing having a single inlet and an outlet, an annular valve seat surrounding and facing away from the inlet, first and second movable diaphragm assemblies in the casing and of substantially equal diameters, said diaphragm assemblies forming a first pressure chamber therebetween, a valve member attached to the first diaphragm assembly and movable therewith to and from the valve seat for opening and closing the inlet, said valve member when closed being subject to liquid pressure within the inlet port across an area bounded by said valve seat and tending to open the same, said second diaphragm assembly being engageable with the first diaphragm assembly for moving the valve member to closed position, a second pressure chamber within the casing, a duct leading from each pressure chamber to a respective pilot valve, each pilot valve being float operated independently of each other and of the diaphragms and adapted to open and close the respective duct to control discharge of liquid from the respective pressure chamber, restricted passages connecting the inlet to each of the pressure chambers, the entire upper side of the first diaphragm assembly being exposed to pressure of liquid within the first chamber when the respective pilot valve is closed and movable thereby for carrying the valve member to closed position, and the upper side of the second diaphragm assembly being exposed to pressure of liquid within the second chamber when the respective pilot valve is closed for urging the second diaphragm assembly into engagement with the first diaphragm assembly for moving the same into valve closing position.

11. A fluid pressure operated valve in accordance with claim 1 wherein the inlet and outlet ports are axially aligned and the casing provides a flow chamber therebetween, a mounting structure is within the flow chamber, the diaphragms are attached at their outer margins to the mounting structure, the second diaphragm has a guide surface associated therewith, and a guide surface on the mounting structure cooperable with the first mentioned guide surface for guiding the movement of the second diaphragm.

12. A fluid pressure operated valve in accordance with claim 1 wherein the inlet and outlet ports are axially aligned and the casing provides a flow chamber therebetween, a mounting structure is within the flow chamber, and the diaphragms are attached at their outer margins to the mounting structure.

13. A fluid pressure operated valve in accordance with claim 2 wherein the inlet and outlet ports are spaced apart and the casing provides a flow chamber therebetween, the casing including a wall extending across the central portion of the flow chamber, and the second pressure chamber being formed between the second diaphragm and the wall.

14. In a fluid pressure operated valve, a casing having a single inlet port and an annular valve seat surrounding the inlet port and facing away therefrom, said casing having a solid ring section spaced from the valve seat so as to form outlet openings therebetween, first and second diaphragms attached at their outer margins to the solid ring section and having movable portions, said portion of each diaphragm being movable in its entirety toward and away from said portion of the other diaphragm to form an expansible first pressure chamber therebetween, said casing including a wall opposite the second diaphragm and forming a second pressure chamber therebetween, a valve plate of greater diameter than the valve seat below the first diaphragm, said valve plate carrying a valve face engageable with the valve seat, a clamping plate of greater diameter than the valve seat above the first diaphragm, said plates being attached to the first diaphragm by a plug which passes through the first diaphragm and said plates, said plug having a restricted orifice therethrough constantly connecting the single inlet port with the first pressure chamber, top and bottom plates above and below the second diaphragm respectively and attached thereto by a solid plug, said bottom plate having a depending outer rim engageable with the clamping plate, a passage through said rim, a restricted passage in the casing constantly connecting the inlet port and the second pressure chamber, ducts in the casing leading from each pressure chamber and adapted to be opened or closed to control discharge of fluid therefrom, a spring in one of said chambers constantly urging the valve plate toward closed position, said valve plate when closed being subject to pressure of fluid within the inlet port across an area bounded by said valve seat tending to open the same, said movable diaphragm portions being of substantially equal diameters and said valve plate and bottom plate being of substantially equal diameters whereby the force transmitted to the second diaphragm by a given fluid pressure acting in the second chamber is substantially the same as the force transmitted to the first diaphragm by said given fluid pressure acting in the first pressure chamber.

15. A valve mechanism for controlling the supply of fluid under pressure into a reservoir to a predetermined level therein comprising a housing, a valve seat in said housing in the path of flow of said fluid, a single valve member adapted to be moved toward a closing position with respect to said seat to shut off the flow, a pair of elements in the housing presenting two walls movable relative to each other, said walls and housing defining two separate pressure chambers, each of the walls having an area larger than the area of the valve seat and subject to fluid pressure in a respective one of said chambers, each of said chambers being in communication with said fluid pressure supply, said housing having a discharge outlet on the same side of said walls as said valve, separate bleed ports connected to said chambers respectively, separate means controlling said bleed ports, and means operatively connecting each of said walls to said valve member to cause said valve member to move to its closed position when either wall is moved by fluid pressure developed in the respective chamber upon closing of the respective bleed port.

16. A valve mechanism for controlling the supply of fluid under pressure into a reservoir to a predetermined level therein comprising a housing, a valve seat in said housing in the path of flow of said fluid, a single valve member adapted to be moved toward a closing position with respect to said seat to shut off the flow, a pair of elements in the housing presenting two walls movable relative to each other, said walls and housing defining two separate pressure chambers, each of the walls having an area larger than the area of the valve seat and subject to fluid pressure in a respective one of said chambers, each of said chambers being in communication with said fluid pressure supply, said housing having a discharge outlet on the same side of said walls as said valve, separate bleed ports connected to said chambers respectively, separate means controlling said bleed ports, said valve member being connected to one of said walls, and said walls having provision for being engageable one with the other, whereby said valve will be moved to a closed position when either wall is caused to move by fluid pressure developed in the respective pressure chamber upon closing of the respective bleed port.

References Cited in the file of this patent

UNITED STATES PATENTS

| | | |
|---|---|---|
| 1,871,044 | Crosthwait et al. | Aug. 9, 1932 |
| 1,988,026 | Unger | Jan. 15, 1935 |
| 2,230,145 | Lechler | Jan. 28, 1941 |
| 2,262,823 | Stearns | Nov. 18, 1941 |
| 2,308,275 | Gauger | Jan. 12, 1943 |
| 2,328,323 | Bowers | Aug. 31, 1943 |
| 2,683,580 | Griswold | July 13, 1954 |